United States Patent
Myers et al.

(10) Patent No.: US 11,735,786 B1
(45) Date of Patent: Aug. 22, 2023

(54) POUCH WITH THERMAL INSULATOR AND PHASE CHANGE MATERIAL

(71) Applicant: Lunar Energy, Inc., Mountain View, CA (US)

(72) Inventors: Nigel Adrien Myers, Mountain View, CA (US); Jason Jaspreet Singh Haer, San Francisco, CA (US); Mark Daniel Goldman, Los Altos Hills, CA (US); Erica Viola Lewis, Portland, OR (US)

(73) Assignee: Lunar Energy, Inc., Mountain View, CA (US)

( * ) Notice: Subject to any disclaimer, the term of this patent is extended or adjusted under 35 U.S.C. 154(b) by 0 days.

(21) Appl. No.: 17/963,807

(22) Filed: Oct. 11, 2022

(51) Int. Cl.
*H01M 10/6569* (2014.01)
*H01M 10/658* (2014.01)
*H01M 10/61* (2014.01)

(52) U.S. Cl.
CPC ...... *H01M 10/6569* (2015.04); *H01M 10/61* (2015.04); *H01M 10/658* (2015.04)

(58) Field of Classification Search
CPC . H01M 10/6569; H01M 10/61; H01M 10/658
See application file for complete search history.

(56) References Cited

U.S. PATENT DOCUMENTS

| | | | |
|---|---|---|---|
| 8,273,474 B2 | 9/2012 | Al-Hallaj | |
| 10,003,053 B2 | 6/2018 | Hartmann | |
| 2004/0234711 A1* | 11/2004 | Young | B08B 1/006 |
| | | | 428/34.1 |
| 2012/0251749 A1* | 10/2012 | Lee | B32B 27/32 |
| | | | 428/447 |
| 2020/0287252 A1 | 9/2020 | Li | |
| 2021/0197520 A1* | 7/2021 | Li | B32B 7/02 |
| 2021/0257690 A1* | 8/2021 | Kilhenny | H01M 10/6551 |
| 2022/0158273 A1 | 5/2022 | Khateeb Razack | |

FOREIGN PATENT DOCUMENTS

EP          4064423 A1 * 9/2022

OTHER PUBLICATIONS

Loura Hall, NASA to Begin Testing Next Generation of Spacecraft Heat Exchangers, NASA.gov, Aug. 6, 2017.

* cited by examiner

*Primary Examiner* — Emmanuel E Duke
(74) *Attorney, Agent, or Firm* — Van Pelt, Yi & James LLP

(57) ABSTRACT

A system that includes a wettable thermal insulator, a phase change material, and a flexible pouch. In the event a thermal event occurs, the phase change material changes from a liquid state to a gaseous state. The flexible pouch is configured to envelope the wettable thermal insulator and the phase change material in the liquid state.

20 Claims, 16 Drawing Sheets

TCs at Bottom Layer of Cells in Upper Battery Module

TCs at Top Layer of Cells in Upper Battery Module

TCs at Can Bottom in Upper Battery Module

TCs at Bottom Layer of Cells in Initiated Battery Module

TCs at Top Layer of Battery Cells in Initiated Battery Module

TCs at Can Bottom in Initiated Battery Module

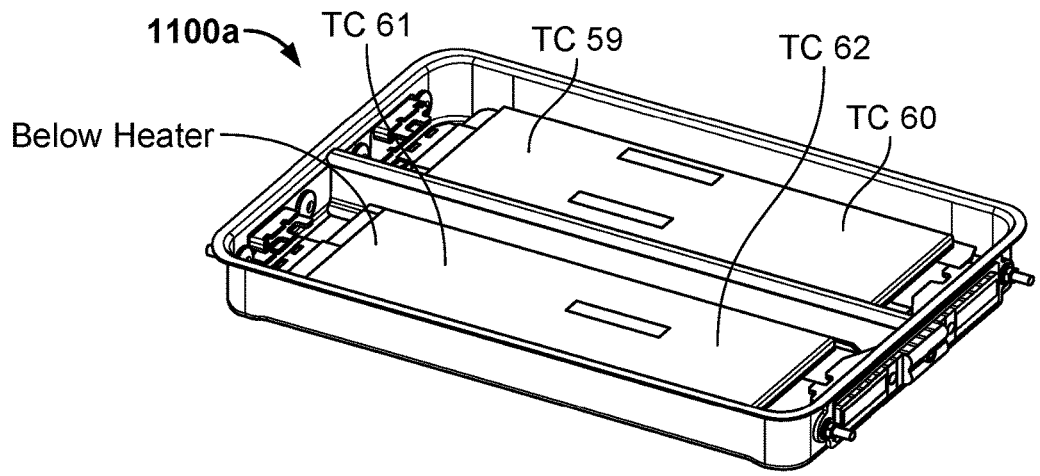
TCs at Bottom Layer of Cells in Lower Battery Module
FIG. 11A
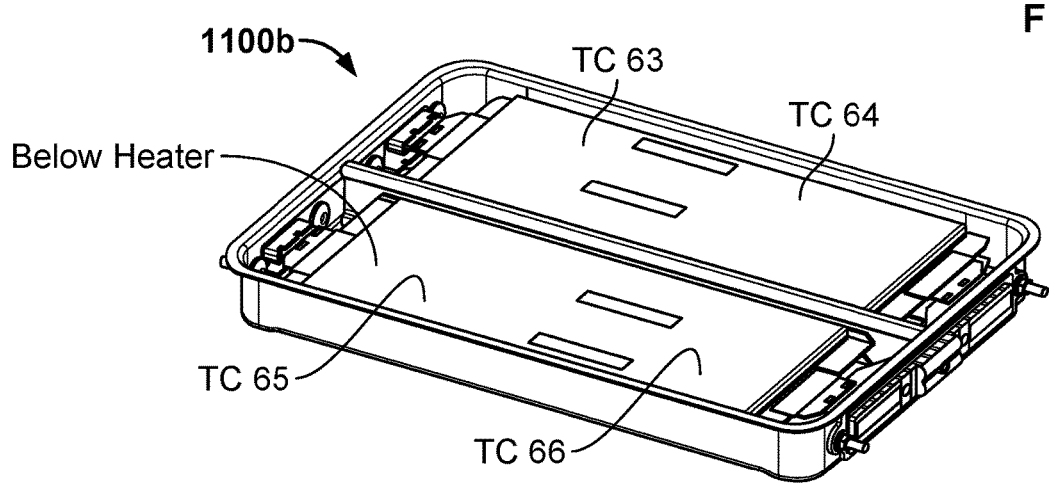
TCs at Top Layer of Battery Cells in Lower Battery Module
FIG. 11B
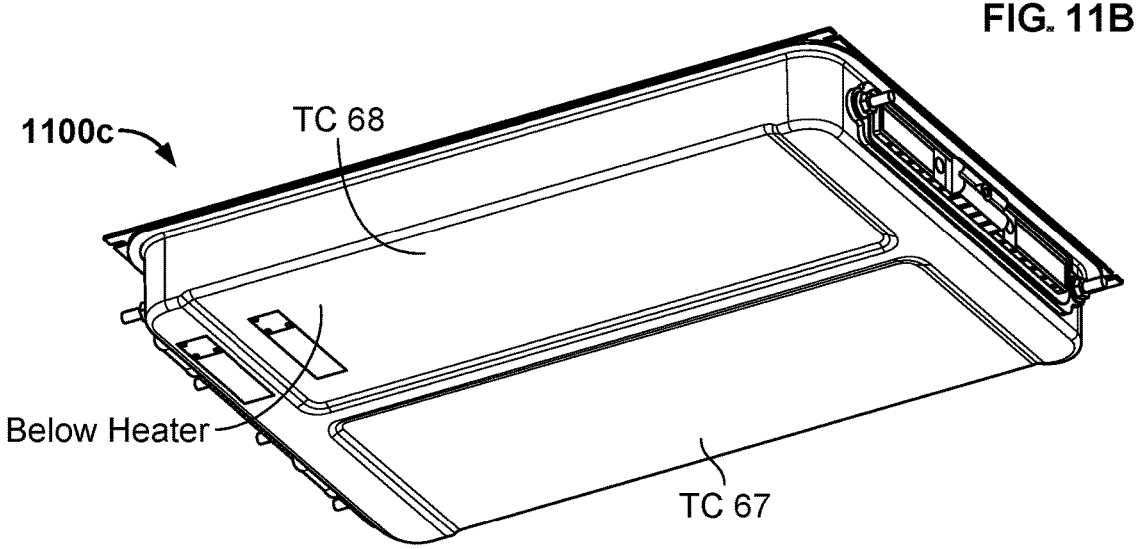
TCs at Can Bottom in Lower Battery Module FIG. 11C

POUCH WITH THERMAL INSULATOR AND PHASE CHANGE MATERIAL

BACKGROUND OF THE INVENTION

Battery cell failures in energy storage systems are characterized by the release of large amounts of heat, and can cause temperature rises for example, on the order of 300-400° C. A particular danger in the event of such a failure is that the (initial) heat released will induce other battery cells and/or battery (sub-)modules in the system to fail, trigger a positive feedback cycle of heat, more failures, more heat being released, and so on. This is referred to as a propagating or cascading failure. New devices and/or techniques to mitigate, retard, and/or interrupt thermal runaway would be desirable.

BRIEF DESCRIPTION OF THE DRAWINGS

Various embodiments of the invention are disclosed in the following detailed description and the accompanying drawings.

FIG. 11A is a diagram illustrating an embodiment of temperature sensors that monitor a bottom layer of battery cells in a lower battery module during a thermal test.

FIG. 11B is a diagram illustrating an embodiment of temperature sensors that monitor a top layer of battery cells in a lower battery module during a thermal test.

FIG. 11C is a diagram illustrating an embodiment of temperature sensors placed at a can bottom in a lower battery module during a thermal test.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Various embodiments of systems and/or techniques to mitigate and/or retard the propagation or cascade of thermal runaway and/or battery failure using a pack or a pouch that contains a thermal insulator (e.g., a wettable and/or non-woven thermal insulator, such as ceramic woold) and a phase change material (e.g., a liquid-to-gas phase change material) are described herein. In the event of a thermal event (e.g., originating from the failure of one or more battery cells, such as in an energy storage system (ESS)), the phase change material absorbs the heat from the thermal event and changes from a liquid state to a gaseous state. In some embodiments, the system is designed to have the pouch burst or otherwise rupture once the phase change material is completely (or at least mostly) in the gaseous state (e.g., due to the pressure from the gas), permitting the hot gas to vent and diverting that vented heat from the positive feedback cycle associated with propagating or cascading battery failures.

Figure 1:
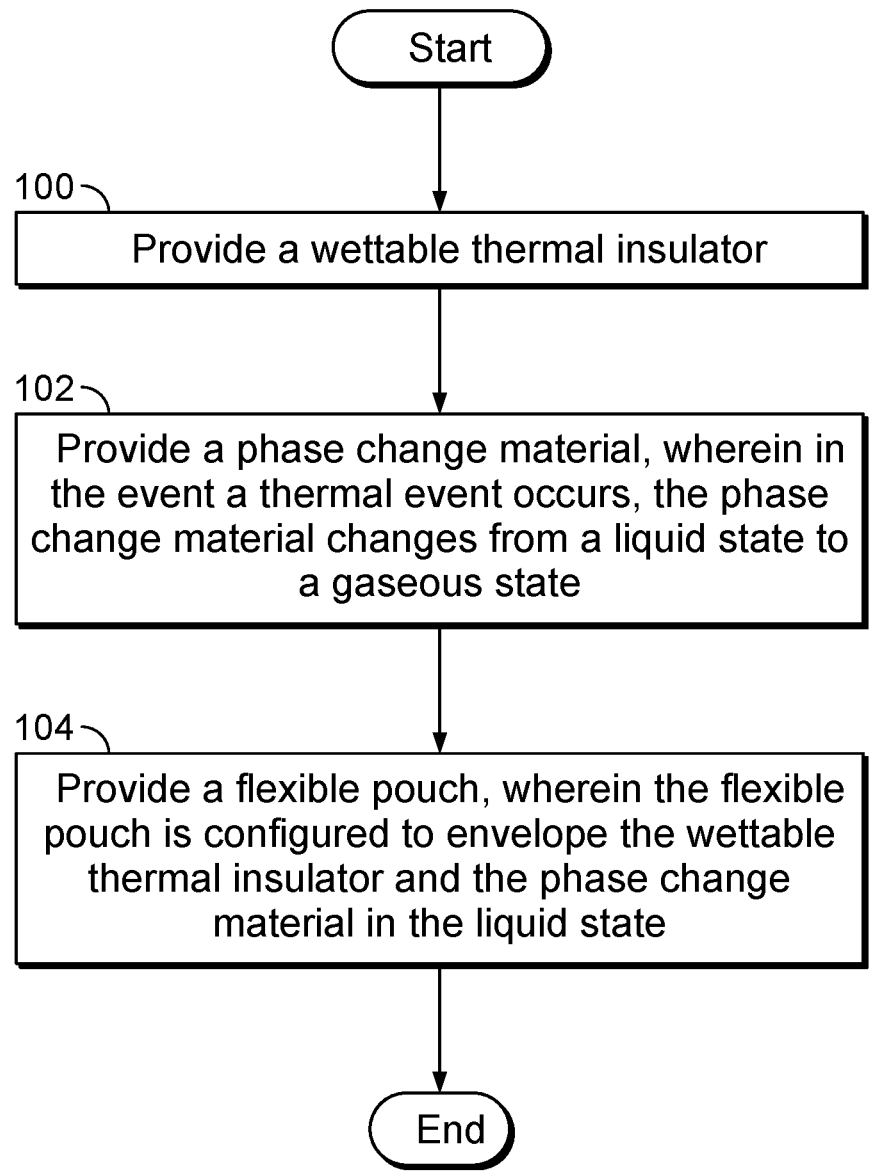
FIG. 1 is a flowchart illustrating an embodiment of a process to provide a pouch with a wettable thermal insulator and a phase change material to absorb thermal energy associated with a battery failure and/or thermal runaway.

FIG. 1 is a flowchart illustrating an embodiment of a process to provide a pouch with a wettable thermal insulator and a phase change material to absorb thermal energy associated with a battery failure and/or thermal runaway. In some embodiments, the process of FIG. 1 is performed by a pouch system that is disposed or otherwise placed above a plurality of battery cells, where the pouch system absorbs any thermal energy released by the battery cells below the pouch system in the event of a battery (cell) failure and/or thermal runaway.

At 100, a wettable thermal insulator is provided. As used herein, the term "wettable" as it relates to the thermal insulator means that the thermal insulator is able to retain, hold, and/or transport a phase change material in liquid form. In some embodiments, the phase change material is polar (e.g., water) and the thermal insulator is made of a material that is wettable for the polar phase change material. If a polar liquid is used, then it may be desirable to use a hydrophilic material for the thermal insulator. In some embodiments, the physical and/or mechanical arrangement of the thermal insulator permits absorption of the liquid through capillary action.

In various embodiments, the wettable thermal insulator includes one or more of the following: a non-woven (NW) thermal insulator, a non-flammable thermal insulator, ceramic wool, mineral wool, stone wool, or fiberglass.

Wettable thermal insulators have two important properties that make them useful in mitigating thermal runaway. First, they are good at absorbing, wicking, and/or redistributing liquid. For example, the wettable thermal insulator may be a non-woven thermal insulator. Generally speaking, the non-woven fibers in a NW thermal insulator make them "fluffier" than woven thermal insulators, so NW thermal insulators can hold more water (or other phase change material in liquid form) compared to woven thermal insulators. For all wettable thermal insulators, in the event a thermal event occurs, there is more liquid stored or otherwise available and during the phase change any remaining liquid can (more) easily be redistributed to "hot spots" that have dried out (e.g., versus non-wettable thermal insulators).

A second important property of wettable thermal insulators is that they offer good thermal insulation, even after (or if) the phase change material is dispersed. As will be described in more detail below, in some embodiments, the phase change material (in gas form) has escaped from the pouch, the NW thermal insulator is still present and offers some thermal insulation from any remaining heat produced by the battery failure and/or thermal event. Furthermore, many thermal insulator are non-flammable; non-flammable thermal insulators will not ignite and will therefore not add additional thermal energy to the system.

At 102, a phase change material is provided, wherein in the event a thermal event occurs, the phase change material changes from a liquid state to a gaseous state. For example, the thermal event may be associated with a battery failure and/or thermal runaway. The heat produced by a thermal event (e.g., from a failed battery cell) is conducted into or otherwise enters the phase change material and is "absorbed" by the liquid-to-gas phase change. As a result, the maximum temperature of other (e.g., functioning and/or adjacent) battery cells is regulated (e.g., at least during the phase change state) by the phase change material. To put it another way, the phase change material vaporizes at a temperature that prevents other (e.g., functioning) battery cells from experiencing a thermal event and/or battery failure.

In some embodiments, the phase change material includes one or more of the following: $H_2O$, a salt, an alcohol, a mineral oil, or a paraffin. In some embodiments, the phase change material is selected to have a boiling point that prevents additional battery cells (e.g., that are functional) from experiencing a failure due to excessive thermal energy (e.g., the boiling point is less than a critical temperature associated with the battery cells). For example, by adding (a) salt (or other additives) to pure water, the salted water will have a higher boiling point than pure water, which may be desirable in some applications. The freezing point of the salted water may also go down, which may be desirable in some applications (e.g., if the battery system will be exposed to freezing temperatures).

At 104, a flexible pouch is provided, wherein the flexible pouch is configured to envelope the wettable thermal insulator and the phase change material in the liquid state. In some embodiments, the flexible pouch is made of a plurality of layers that includes one or more of the following: a layer of a vapor barrier (e.g., a metal foil, such as aluminum or an aluminum alloy), a layer of heat-sealable plastic, food grade packaging material, or GEE retort film.

In some embodiments, the thermal event is associated with a failure of at least one of a plurality of battery cells and the NW thermal insulator, the phase change material, and the flexible pouch are disposed above the plurality of battery cells.

In some embodiments, a layer of heat-sealable plastic (e.g., used as one of the layers in the flexible pouch) is selected, at least in part, based on one or more of the following: abrasion resistance, puncture resistance, or an ability to tear in a preferred direction.

In some embodiments, the pouch is designed to pop from the pressure of the (e.g., hot) phase change material in a gaseous state. The following figures describe one such example where the wettable thermal insulator is a non-woven (NW) thermal insulator. It is noted that some of the benefits and/or properties described in the figures below are not necessarily limited to NW thermal insulators and/or pouches that pop; other embodiments that are not so configured may have the same or similar properties and/or benefits.

Figure 2A:
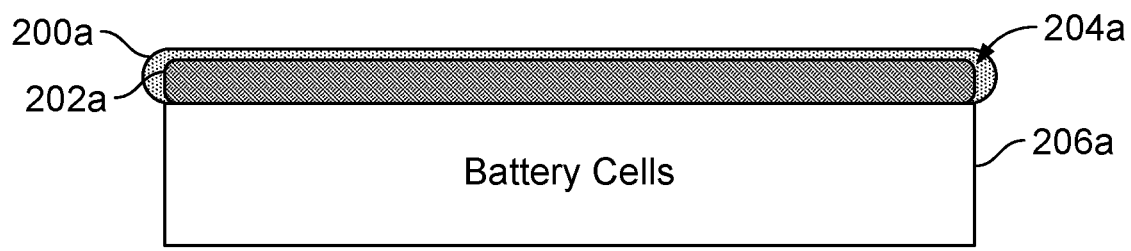
FIG. 2A is a diagram illustrating an embodiment of a pouch with a non-woven (NW) thermal insulator and a phase change material, prior to a thermal event.

FIG. 2A is a diagram illustrating an embodiment of a pouch with a non-woven (NW) thermal insulator and a phase change material, prior to a thermal event. In this example, the pouch (200a) encloses or otherwise envelops a NW thermal insulator (202a) and a phase change material (204a). In the state shown here, the phase change material (204a) is in a liquid state and penetrates and surrounds the NW thermal insulator (202) which is wettable, porous, and/or absorbent. For convenience, phase change material in a liquid state is sometimes referred to herein as a liquid.

It is desirable for the system shown here to have a lifetime that is on the order of decades. To that end, the pouch material is carefully selected to minimize the loss of the phase change material (which is stored in liquid form) and the degradation of the pouch material over years or even decades. In some embodiments, the pouch material is a flexible, non-porous material with these properties, such as a food grade packaging material. Some food grade packaging materials are designed to store food in a freezer for years and have an estimated loss of ~2% of the phase change material over 20 years. This is helpful in maintaining the heat-absorbing properties of the pouch and its contents over the lifetime of the battery system.

In one example, the pouch is made of GEE retort film (a type of food grade packaging material) that has a 12 μm layer of polyethylene terephthalate (PET), a 9 μm layer of aluminum, a 25 μm layer of nylon (NY), and a 100 μm layer of retort grade cast polypropylene (CPR) for a total thickness of 146±13 μm (i.e., a range of 133-159 μm). More generally, the pouch may be made of a material with one or more layers of plastic on each side of a (e.g., thin) layer of aluminum (e.g., two layers of plastic, a layer of aluminum, and then another layer of plastic).

In some embodiments, the wettable thermal insulator includes a non-woven (NW) ceramic wool, the phase change material includes $H_2O$, and the flexible pouch includes GEE retort film. In some embodiments, the flexible pouch includes GEE retort film and the GEE retort film includes a layer of polyethylene terephthalate (PET), a layer of aluminum, a layer of nylon (NY) and a layer of cast polypropylene (CPR). In some embodiments, the flexible pouch includes GEE retort film; the GEE retort film includes a layer of polyethylene terephthalate (PET), a layer of aluminum, a layer of nylon (NY), and a layer of cast polypropylene (CPR); the GEE retort film has a thickness within a range of 133-159 μm.

In some embodiments, the pouch (200a) is pre-formed to have an opening on one end. The NW thermal insulator (202a) and a phase change material (204a) may be inserted into the opening and then the opening is (e.g., heat) sealed. Alternatively, the pouch may be formed using two sheets of the pouch material and (e.g., heat) sealed along the edge (e.g., four straight edges if a rectangular shape is desired). It is noted that a variety of shapes and/or dimensions may be formed or otherwise manufactured, as desired, to fit a specific clearance, a desired footprint, etc. The pouch manufacturing technique may be selected based on application-specific requirements and/or objectives, including a desired shape.

A benefit of using a food grade packaging material for the pouch is that sealing techniques and/or tools are readily available. For example, a pouch made of food grade packaging material may be sealed with a banded heat sealer. The sealer has heated rollers, the pouch with its contents are inserted into the machine, and the heated rollers run along the top, melting and sealing the pouch.

In some embodiments, the NW thermal insulator (202a) includes a ceramic wool (e.g., a matrix of ceramic fibers). In some embodiments, the NW thermal insulator (202a) includes as a mineral wool, such as stone wool.

Returning to the example of FIG. 2A, the pouch system (e.g., which includes the pouch (200a), the NW thermal insulator (202a), and phase change material (204a)) is disposed or otherwise placed above a plurality of battery cells (206a) and is used to mitigate thermal runaway in the event one or more of the battery cells (206a) fails and releases a large amount of heat. The following figure shows the beginning of a thermal event associated with a battery (cell) failure.

Figure 2B:
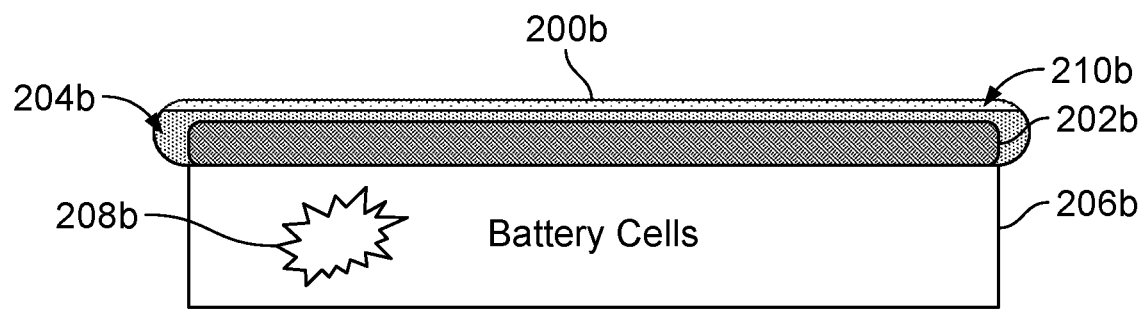
FIG. 2B is a diagram illustrating an embodiment of a pouch with a non-woven (NW) thermal insulator and a phase change material after a thermal event in the battery cells has started.

FIG. 2B is a diagram illustrating an embodiment of a pouch with a non-woven (NW) thermal insulator and a phase change material after a thermal event in the battery cells has started. In the example shown, one or more of the battery cells (206b) has failed, which generates a large amount of heat (i.e., thermal event (208b)). The thermal event (208b) may produce temperatures on the order of 300-400° C. and it is important to prevent a thermal runaway from triggering additional thermal runaways. Although the terms "thermal runaway" and "battery failure" may be used interchangeably in describing some of the (e.g., battery failure) examples herein, a thermal runaway is not necessarily associated with and/or (only) triggered by a battery failure.

The heat from the thermal runaway (208b) causes the liquid (202b) in the pouch (200b) to undergo a phase change from a liquid state to a gaseous state. For example, in the state shown here, some of the phase change material is in a gas state (220b) and some is (still) in a liquid state (204b). For convenience, phase change material that is in a gas state is sometimes referred to herein as a gas.

Eventually, all of the phase change material will be in the gaseous state, as is shown in the next figure. As will be described in more detail below, while the phase change material goes from 0% liquid to 100% gas (or whatever percentage of gas causes the pouch to burst open), the temperature above the pouch (200b) on the far side of the thermal event (208b) will be relatively steady at the boiling point of the phase change material (e.g., at or near 100° C. for water).

One factor in selecting the phase change material is the energy consumed in changing from a liquid state to a gaseous state (i.e., the specific latent heat of vaporization). All other things being equal, a material that absorbs more energy during its liquid to gas phase change would be preferable over one that absorbs less energy.

The wicking and/or ability of a phase change material (in liquid form) to be redistributed by the NW thermal insulator during the phase change period is driven by surface tension and the capillary forces that it experiences. As such, in some embodiments, surface tension is a consideration in selecting the phase change material.

Another consideration may be the clamping temperature and/or boiling point of the potential phase change material. For example, it would be desirable for the expected range of (e.g., ambient) temperatures to be less than the clamping temperature and/or boiling point so that substantially all of the phase change material is stored in the liquid state and the energy absorption capacity can be preserved for a battery (cell) failure.

Another consideration in selecting the phase change material is flammability. In some applications, a non-flammable material may be preferred over a flammable material.

To summarize, in some embodiments, the phase change material is selected based on one or more of the following (e.g., material) properties: specific latent heat of vaporization, surface tension, boiling point, or flammability.

Figure 2C:
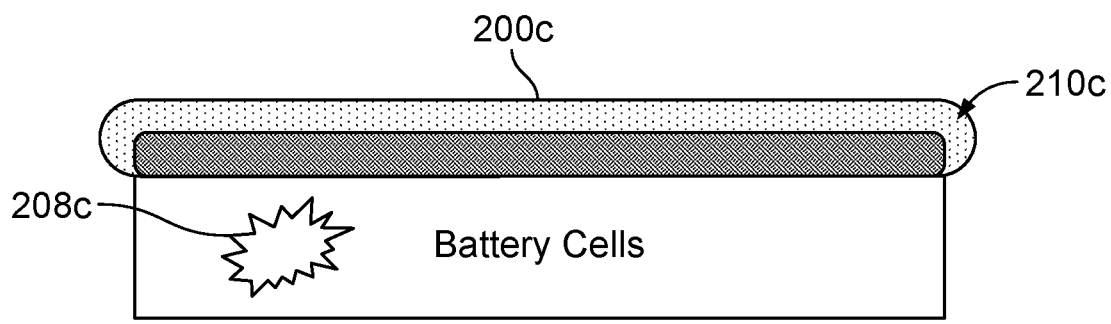
FIG. 2C is a diagram illustrating an embodiment of a pouch with a non-woven (NW) thermal insulator and a phase change material that is entirely in a gaseous state.

FIG. 2C is a diagram illustrating an embodiment of a pouch with a non-woven (NW) thermal insulator and a phase change material that is entirely in a gaseous state. In the state shown here, the heat from the thermal event (208c) has caused all of the phase change material in the pouch to evaporate so that it is 100% gas (210c). With all of the phase change material completely in gas form, the temperature inside the pouch (200c) will begin to increase. The pouch material is not elastic or otherwise "stretchy" and so the volume of the pouch (and thus the gas) is fixed. The combination of increasing temperature and a fixed volume will cause the pressure inside of the pouch to build until the pouch bursts. The following figure shows an example of this.

Figure 2D:
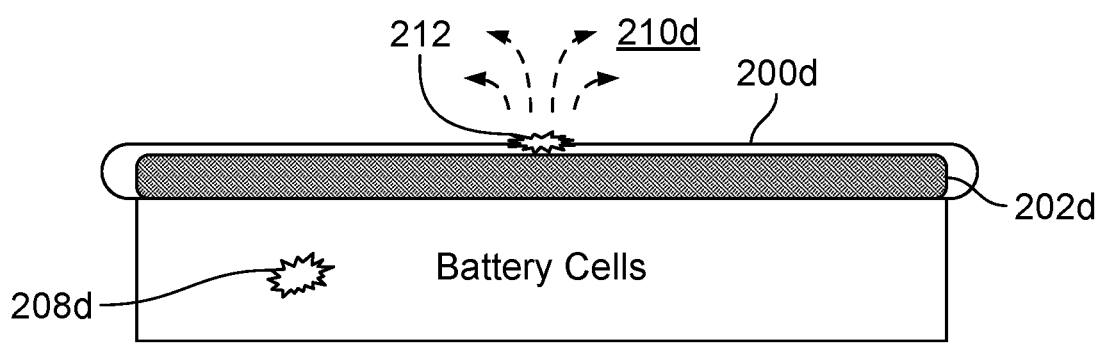
FIG. 2D is a diagram illustrating an embodiment of a burst pouch with a non-woven (NW) thermal insulator and vented phase change material.

FIG. 2D is a diagram illustrating an embodiment of a burst pouch with a non-woven (NW) thermal insulator and vented phase change material. In the state shown here, the pouch (200d) has burst open and has a hole (212) via which the gas (210d) vents or otherwise escapes. This is desirable in mitigating thermal runaway because the vented gas removes the heat from the positive feedback cycle associated with thermal runaway.

Even after the gas (210d) has left the escaped, the thermal insulator (202d) remains behind and offers protection against remaining heat from the thermal event (208d). This, for example, helps to protect vertically adjacent battery (sub-)modules (e.g., on a level or layer above or below the failed battery cells).

Conceptually, the pouch system (e.g., with the NW thermal insulator and phase change material) acts as a kind of thermal capacitor, first collecting and/or storing heat during the phase change from liquid to gas and then shunting the heat away from potential victim battery cells by venting or releasing the gas once the pouch bursts.

In one example application, the example pouch system shown in FIGS. 2A-2D is used in an energy storage system (ESS) that includes an inverter and one or more battery blocks. If one of the battery blocks were to fail, the ESS would automatically shut down and the owner of the ESS would need to contact the manufacturer to replace and/or service the ESS. This would be an opportunity for the expended pouch system to be replaced with a fresh one, so the destructive venting of the hot gas (i.e., the burst pouch and escaped phase change material) may be acceptable in at least some applications. With an ESS, it may be more important to prevent a fire in the home or business where the ESS is installed versus having a non-destructive solution.

Some other solutions use a solid-to-liquid phase change material. However, a solid-to-liquid phase change material requires a dispensed thermal interface material (TIM) or gap pad to create a thermal interface. This limits flexibility in system design and in some cases adds significant cost to the assembly process (e.g., in terms of time and materials). Furthermore, at least some liquid-to-gas phase change materials (e.g., water) have better energy absorption per mass compared to (e.g., commonly used) solid-to-liquid phase change material, so the performance is not as good (at least in some cases). In contrast, with the pouch system described herein, the flexible nature of the pouch material combined with the ability of the liquid (i.e., phase change material) to fill any volume or space it occupies produces a good contact that does not require a thermal interface.

Some other solutions use a liquid-to-gas phase change material (e.g., without a wettable thermal insulator that helps to hold and redistribute the phase change material in liquid form), but they are designed to retain the phase change material even if a thermal event occurs and are therefore often rigid and/or non-destructive. For example, to ensure that a vapor chamber that contains a liquid-to-gas phase change material does not burst, designers often use a metal (e.g., copper) as the material for the vapor chamber and add mass (e.g., thickness in the walls) to ensure that the vapor chamber can withstand the pressures generated by the gas contained therein. Some vapor chambers also use surface tension to draw liquid through a network of (e.g., copper) capillary tubes, and the large surface area of the capillaries also contributes the cost and/or weight of the system. In contrast, the pouch system described herein is flexible and is designed to burst. As a result, lighter and/or less expensive pouch materials may be used (e.g., food grade packaging material versus copper), as well as less of those material (e.g., thinner walls), keeping cost and/or weight down.

It may be helpful to illustrate more detailed examples of a pouch system embodiment in use in a real-world battery system. The following figures illustrate such an example.

Figure 3:
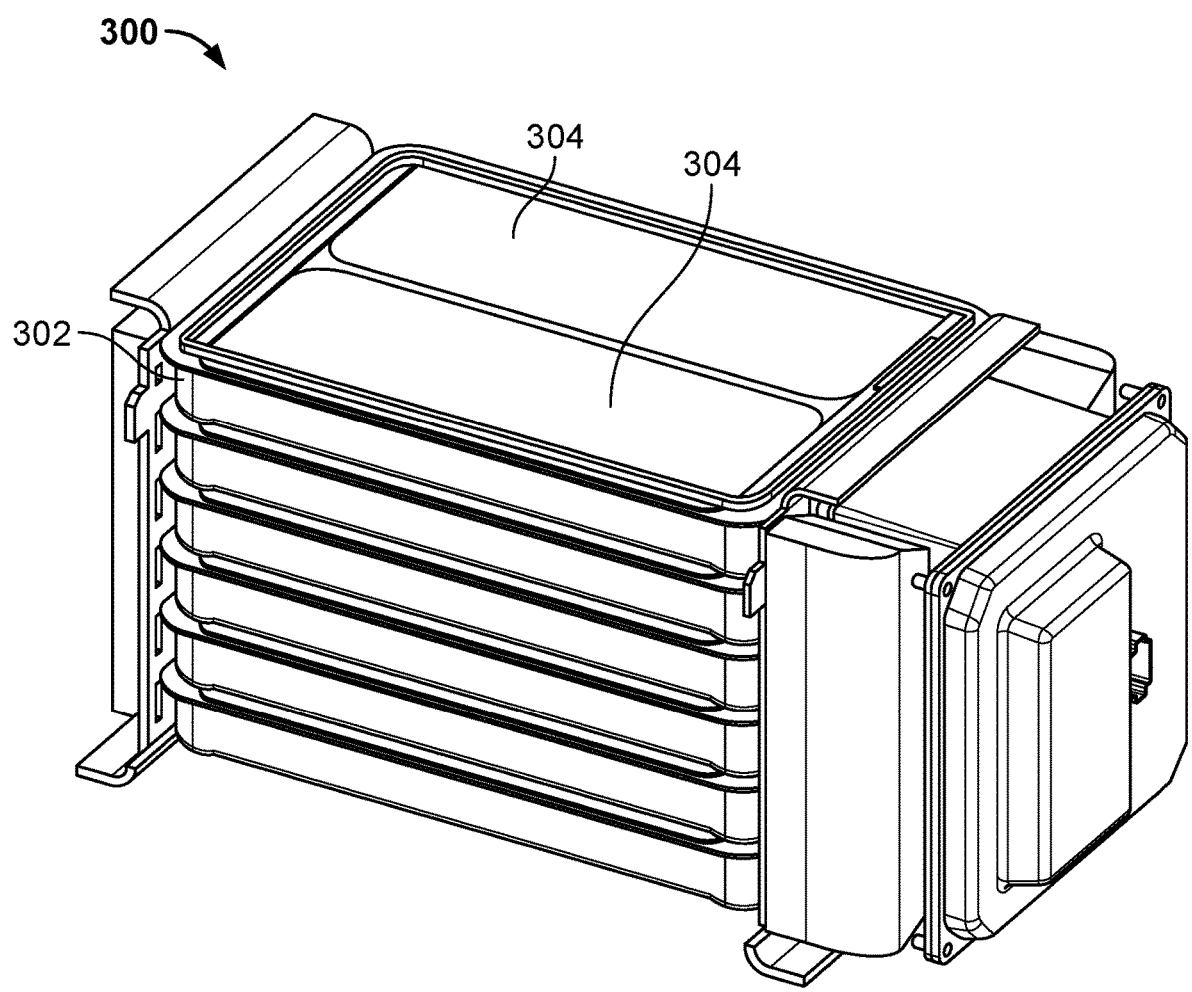
FIG. 3 is a diagram illustrating an embodiment of a battery block that is used in an energy storage system (ESS).

FIG. 3 is a diagram illustrating an embodiment of a battery block that is used in an energy storage system (ESS). In this example, the battery block (300) is a modular component of an ESS (not shown). For example, an ESS may include an inverter block (not shown) and one more battery blocks (300). Depending upon the desired energy storage capacity, an appropriate number of battery blocks are included in the ESS.

In this example, the battery block (300) includes six battery modules (e.g., battery "trays"), including the top battery module (302). Each battery module (e.g., 302), includes two rectangular battery sub-modules (304) with battery cells at the bottom and a pouch with phase change material (e.g., in liquid form) and NW thermal insulator located or otherwise disposed above the battery cells. It is noted that there is an air gap between the top surface of a pouch and the bottom surface of the battery module above the pouch, which makes installation easier compared to a rigid vapor chamber (e.g., made of copper). The following figure shows a single battery module (e.g., 302).

One benefit of having multiple battery modules stacked vertically is that there is some recirculation due to heat transfer due to the relatively large temperature differential between a lower and hotter battery module (e.g., experiencing thermal runaway) and a cooler and upper battery module (e.g., that is not currently experiencing thermal runaway). This heat transfer permits some of the phase change material in the lower and hotter battery module to condense back to liquid form so that it can absorb more heat. This recirculation permits additional thermal performance.

Figure 4:
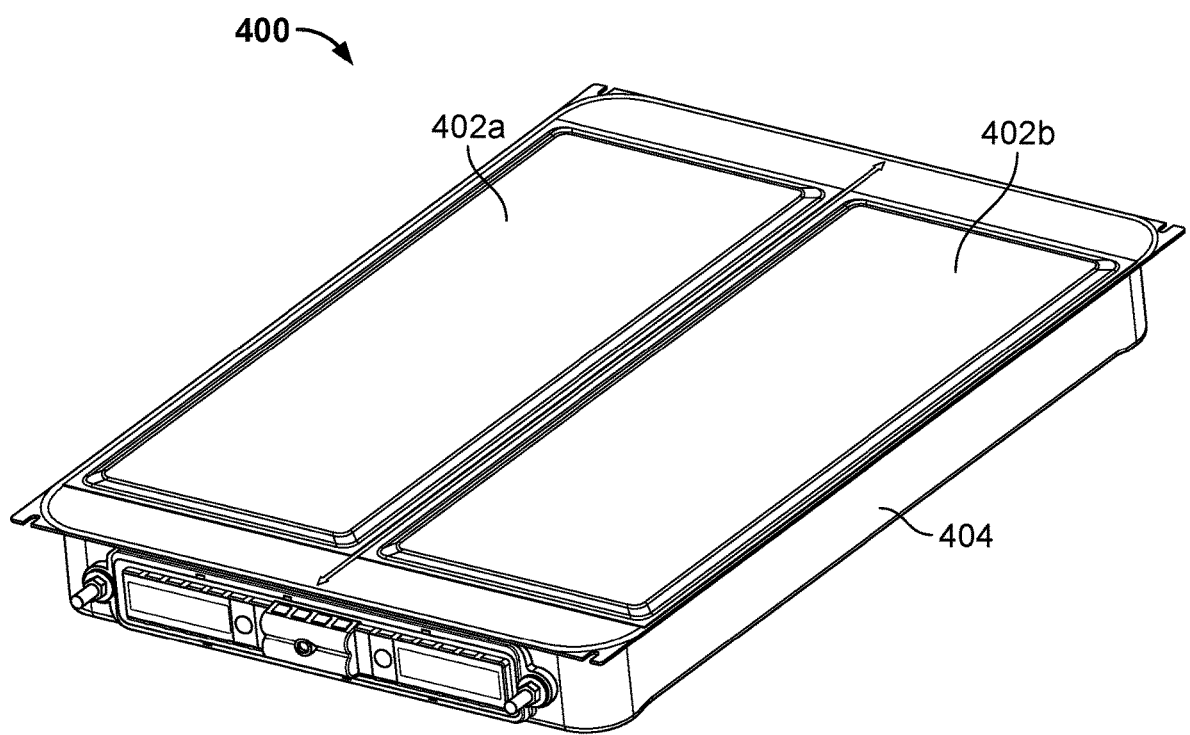
FIG. 4 is a diagram illustrating an embodiment of a battery module, including a pouch with a non-woven (NW) thermal insulator and a phase change material.

FIG. 4 is a diagram illustrating an embodiment of a battery module, including a pouch with a non-woven (NW) thermal insulator and a phase change material. As described above, some other embodiments may use other types of wettable thermal insulators. In this example, the battery module (400) includes two sealed battery sub-modules (402a and 402b) that are separated by a divider or partition such as a central rib. In some embodiments, the central rib is also designed to limit side-to-side propagation of heat within the battery module. Within each battery sub-module (402a and 402b), battery cells are located at the bottom of the container or can (404), with a pouch system located on the top of each battery sub-module, above the battery cells. The following figure shows a cross section of the battery module (400) which more clearly illustrates these components.

Figure 5:
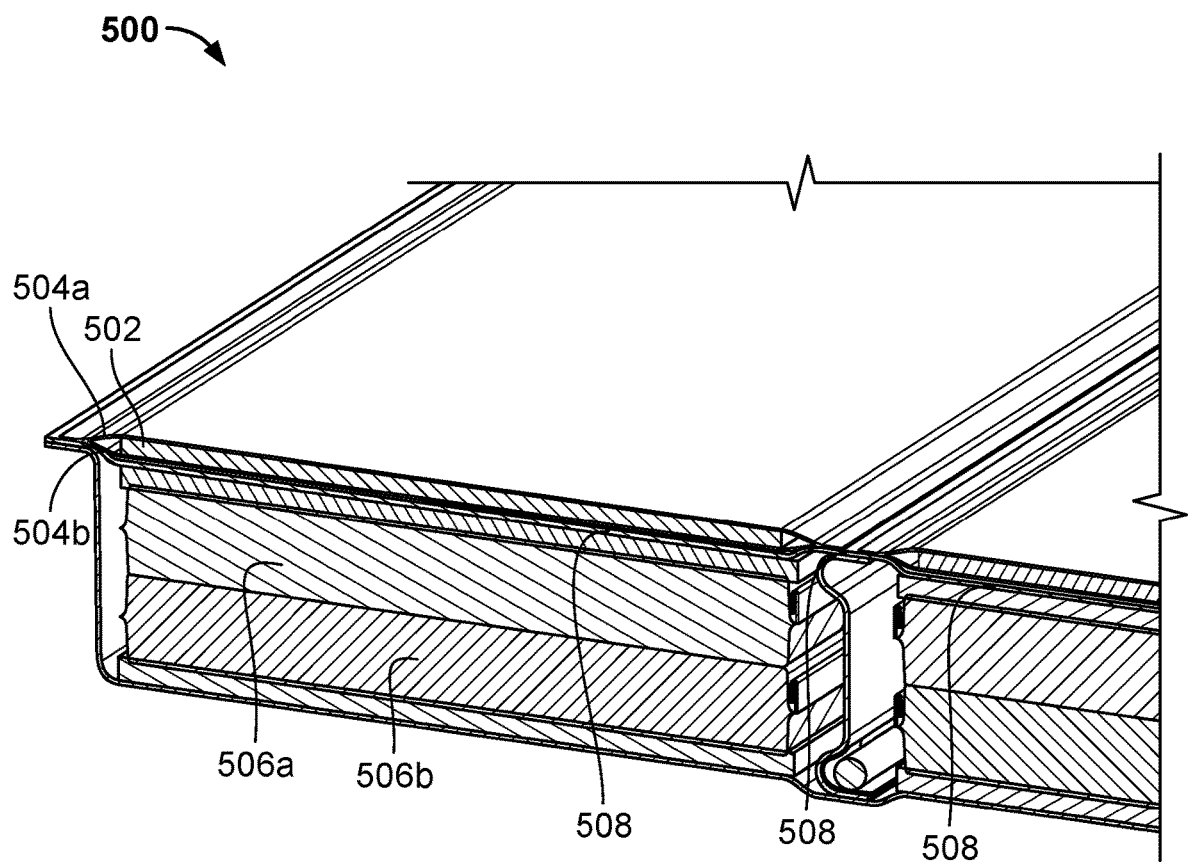
FIG. 5 is a diagram illustrating an embodiment of a cross section of a battery module, including a pouch with a non-woven (NW) thermal insulator and a phase change material.

FIG. 5 is a diagram illustrating an embodiment of a cross section of a battery module, including a pouch with a non-woven (NW) thermal insulator and a phase change material. In this example, the left battery sub-module (500) is shown, for example corresponding to battery sub-module 402a in FIG. 4.

In this example, the NW thermal insulator (502) is "sandwiched" between an upper layer (504a) and lower layer (504b) of the pouch material. The NW thermal insulator (502) in this example is ⅛ inch thick and cut to have a 1-3 mm clearance to seal the edges of the pouch.

The phase change material (not shown) in a liquid form is also enveloped by the pouch (504a and 504b) so that the liquid surrounds, fills, and/or is absorbed by the NW thermal insulator (502).

To properly position the pouch system (e.g., which includes 502, 504a, and 504b) above the battery cells (506a and 506b), a tray or basket (508) is used to cradle or otherwise hold the pouch system. This basket (508) positions the pouch system so that the edges of the NW thermal insulator (502) substantially align with the edges of the battery cells (506a and 506b). In this particular example, a single basket (508) with two depressions is used to hold the left and right pouch systems.

Thermal tests were conducted on the exemplary battery block and associated components described above in FIGS. 3-5 with pouches that contained just the phase change material (and no thermal insulator) as well as pouches with the phase change material plus the thermal insulator. The following figures describe the test results.

Figure 6:
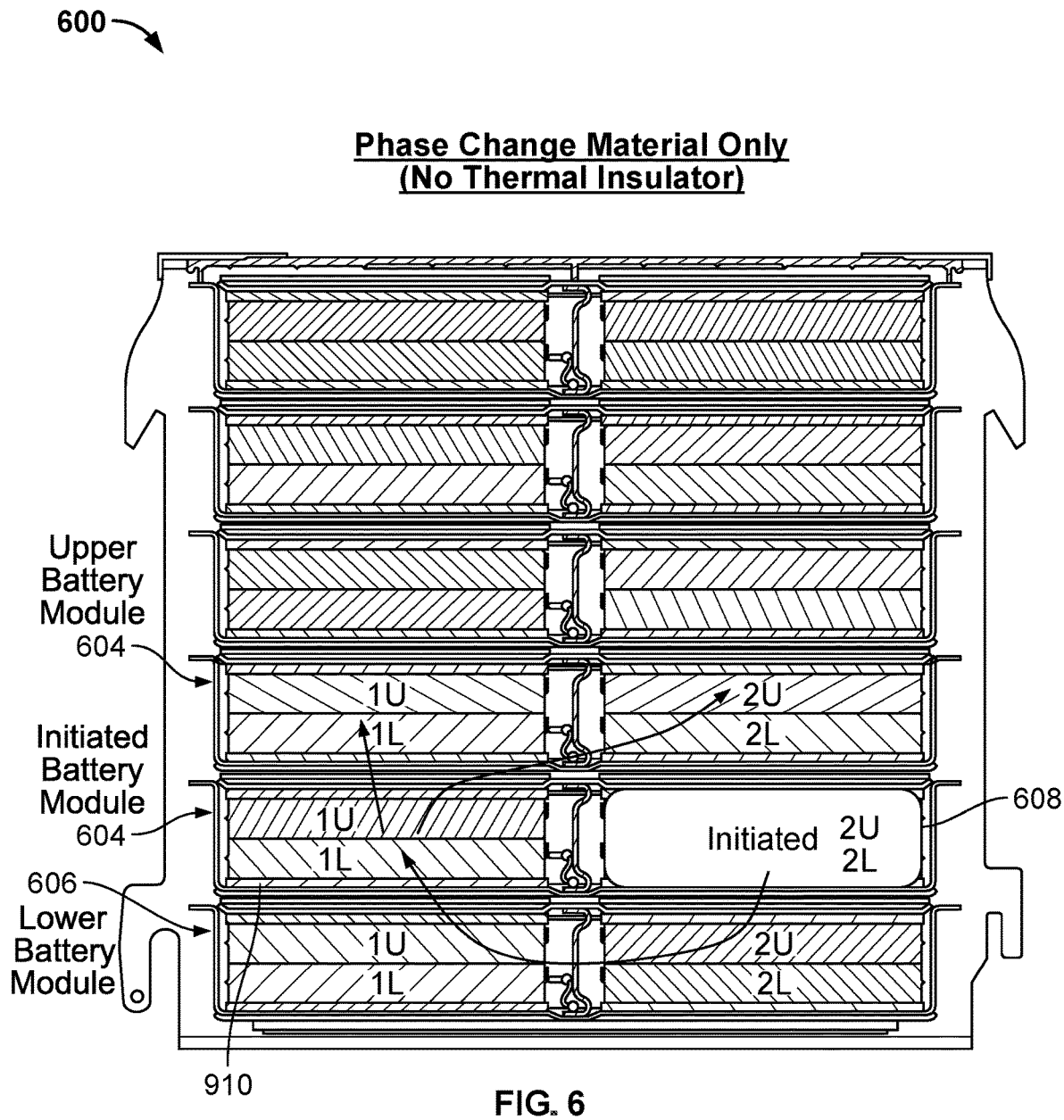
FIG. 6 is a diagram illustrating an embodiment of propagation test results in a battery block where the pouches only contain phase change material and no thermal insulator.

FIG. 6 is a diagram illustrating an embodiment of propagation test results in a battery block where the pouches only contain phase change material and no thermal insulator. In this example, the battery block (600) includes six battery modules, including an initiated (i.e., second-from-bottom) battery module (602), an upper (i.e., the third-from-bottom) module battery module (604), and a lower (i.e., bottommost) battery module (606).

To simulate a battery cell failure, a film heater (not shown) is placed on the lower face of one or more (initiated) battery cells within an initiated battery sub-module (608), which in this example is the right battery sub-module in the second-from-bottom battery module.

In this configuration, there was significant propagation throughout the battery block (600). After initiation the test at 0 seconds (i.e., turning on the heater) in the initiated sub-module (608), propagation spread to the lower battery module (606). From the lower battery module (606), the thermal runaway then spread to the left, non-initiated sub-module (610) in the initiated battery module (602). Thermal runaway then propagated to the upper battery module (604). A more detailed timeline is described in the table below.

| Propagation timeline corresponding to FIG. 6. | |
|---|---|
| Propagation Location | Time |
| Initiated battery module - 2L | 0 seconds |
| Initiated battery module - 2U | 50 seconds |
| Lower battery module - 2U | 400 seconds |
| Lower battery module - 2L | 430 seconds |
| Lower battery module - 1U | 1960 seconds |
| Initiated battery module - 1L | 2050 seconds |
| Initiated battery module - 1U | 2060 seconds |
| Upper battery module - 1L and 2U | 2460 seconds |

The following figures show temperatures measured during the thermal test in the upper battery module (604), the initiated battery module (602), and the lower battery module (606). Returning briefly to FIG. 5, it is noted that there are two layers of battery cells in the battery sub-module: an upper layer (506a) and a lower layer (506b). As such, temperature sensors are positioned to measure the temperatures of battery cells in the upper layer as well as the lower layer.

Figure 7A:
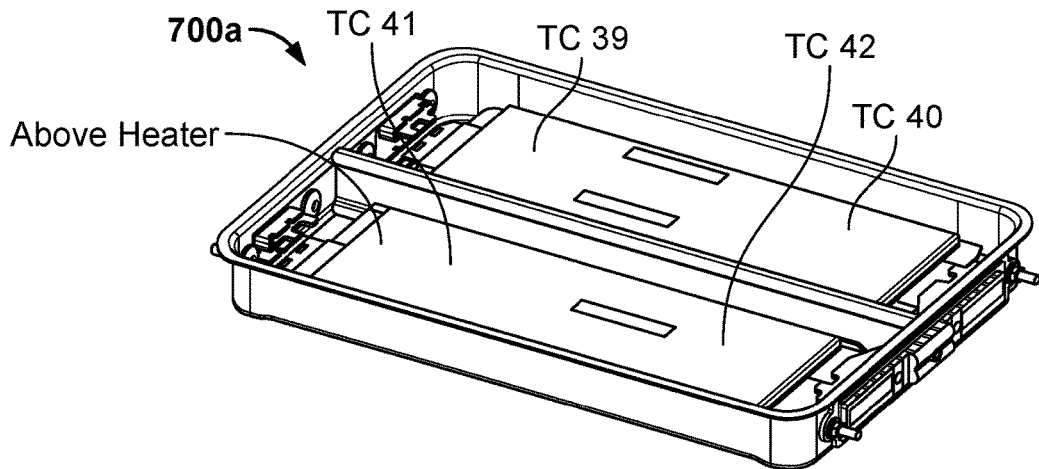
FIG. 7A is a diagram illustrating an embodiment of temperature sensors that monitor a bottom layer of battery cells in an upper battery module during a thermal test.

FIG. 7A is a diagram illustrating an embodiment of temperature sensors that monitor a bottom layer of battery cells in an upper battery module during a thermal test. In this example, thermocouples (TC), a type of temperature sensors, are used to measure the temperature at various locations through the system.

As shown here, TC 39 and TC 40 measure the temperature at a bottom layer of battery cells in the upper battery module (700a) but are not positioned above the half where the heater is; TC 41 and TC 42 measure the temperature at a bottom layer of battery cells and are above the half where the heater (which is in the battery module below this one).

Figure 7B:
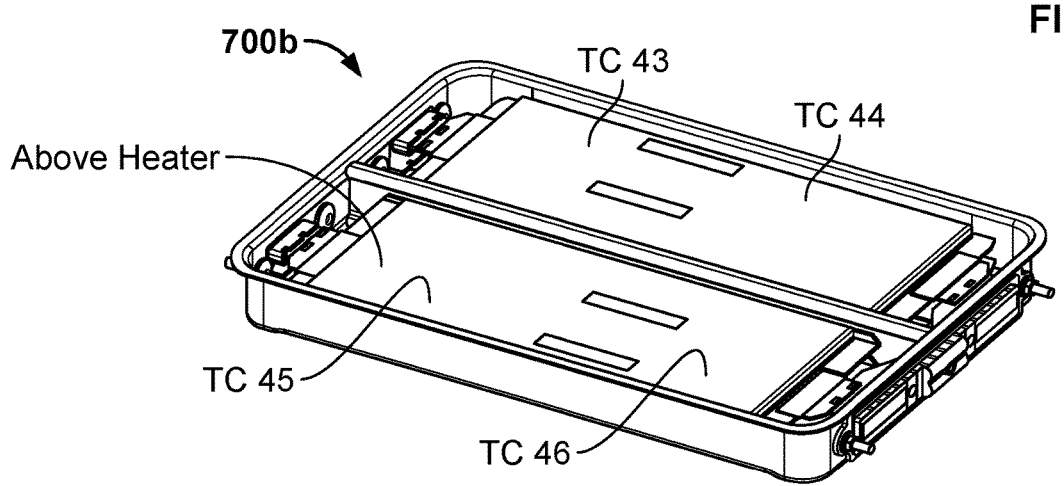
FIG. 7B is a diagram illustrating an embodiment of temperature sensors that monitor a top layer of battery cells in an upper battery module during a thermal test.

FIG. 7B is a diagram illustrating an embodiment of temperature sensors that monitor a top layer of battery cells in an upper battery module during a thermal test. As shown here, TC 43 and TC 44 are placed at a top layer of battery cells in the upper battery module (700b) but not above the half where the heater is (which is in the battery module below this one); TC 45 and TC 46 are placed at a top layer of battery cells in the upper batter module (700b) above the half where the heater is (which is in the battery module below this one).

Figure 7C:
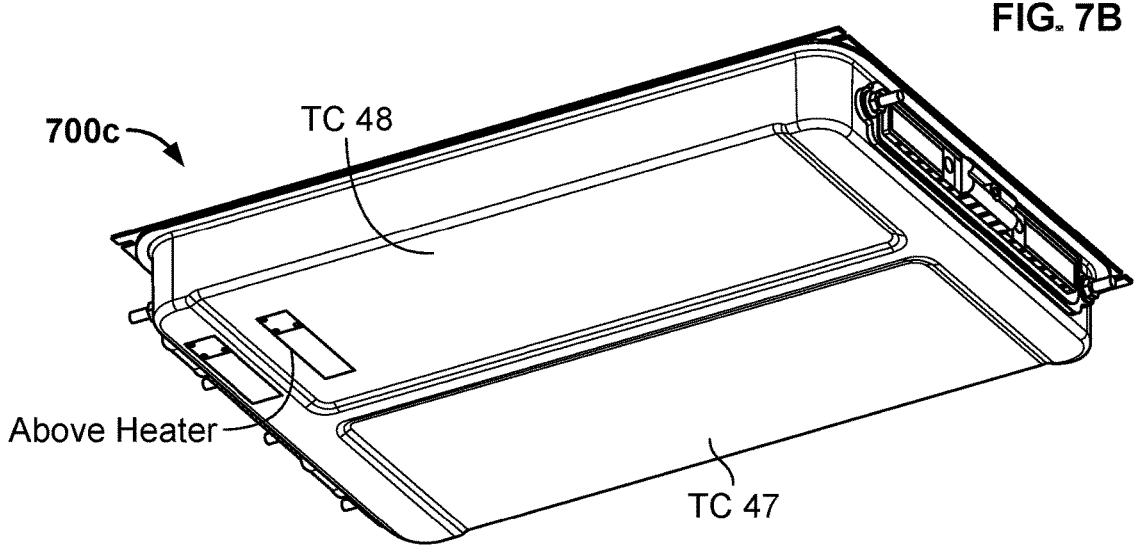
FIG. 7C is a diagram illustrating an embodiment of temperature sensors placed at a can bottom in an upper battery module during a thermal test.

FIG. 7C is a diagram illustrating an embodiment of temperature sensors placed at a can bottom in an upper battery module during a thermal test. As shown here, TC 47 is positioned at the can bottom of the upper battery module (700c) but not above the half with the heater; TC 48 is positioned at the can bottom of the upper battery sub-module, above the half with the heater.

Figure 8:
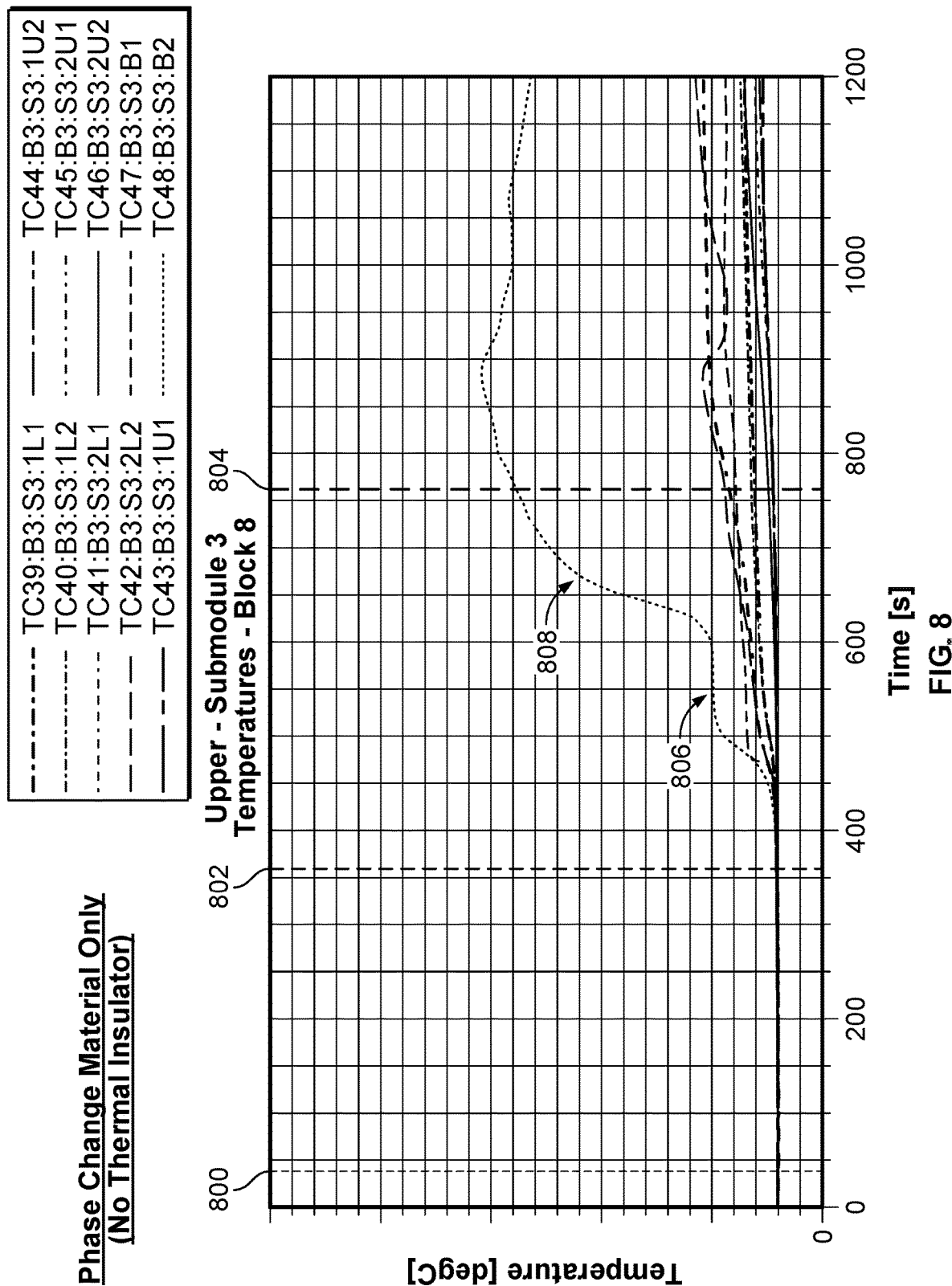
FIG. 8 is a graph illustrating an embodiment of temperatures in an upper battery module where the pouches only contain phase change material and no thermal insulator.

FIG. 8 is a graph illustrating an embodiment of temperatures in an upper battery module where the pouches only contain phase change material and no thermal insulator. In these thermal tests, the critical temperature threshold for battery cells is ~150-180° C. (at least for the battery chemistry used in the tested battery system) because adjacent and functional battery cells in this temperature range can enter thermal runaway; this is sometimes referred to herein as propagation.

The thermal test associated with this graph and the following graphs is the same test from which the results and/or information shown in Table 1 and FIG. 6 is obtained. It is noted that in the tables (e.g., Tables 1 and 2), the timescale is the time elapsed since the thermal event whereas in the graphs (e.g., including FIG. 8) the timescale is the time elapsed since the start of the test. Dashed lines indicate events of interest. The first (i.e., left) dashed line (800) corresponds to the heater being turned on. At the second (i.e., center) dashed line (802), the initiated battery cell (e.g., next to the heater) goes into thermal runaway. At the third (i.e., right) dashed line (804), an adjacent and/or neighboring battery cell goes into thermal runaway (i.e., propagation has occurred).

Although some of the battery cells in the upper battery module do go into thermal runaway (e.g., per Table 1, Sub 3 1L and 2U goes into thermal runaway at 2460 seconds), this graph only goes up to 1200 seconds and so that propagation event is not shown.

Figure 9A:
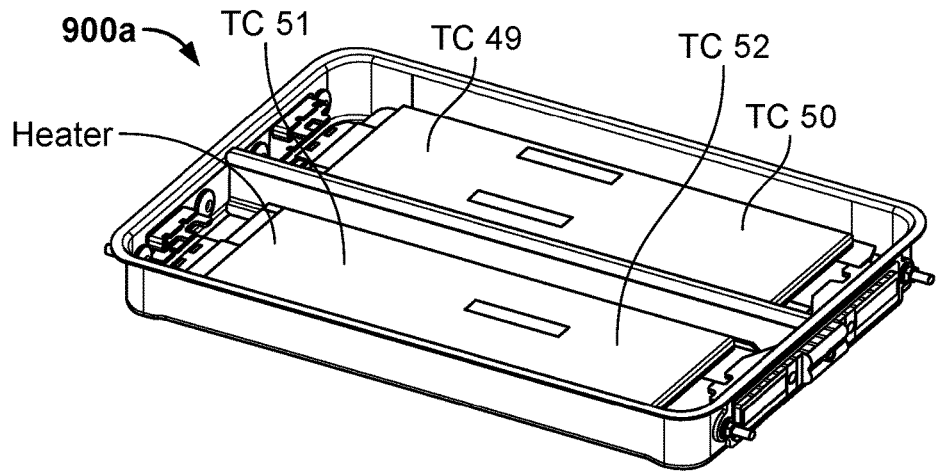
FIG. 9A is a diagram illustrating an embodiment of temperature sensors that monitor a bottom layer of battery cells in an initiated battery module during a thermal test.

FIG. 9A is a diagram illustrating an embodiment of temperature sensors that monitor a bottom layer of battery cells in an initiated battery module during a thermal test. In this example, the placement of temperature sensors TC 49-TC 52 is shown relative to the initiated battery module (900a).

Figure 9B:
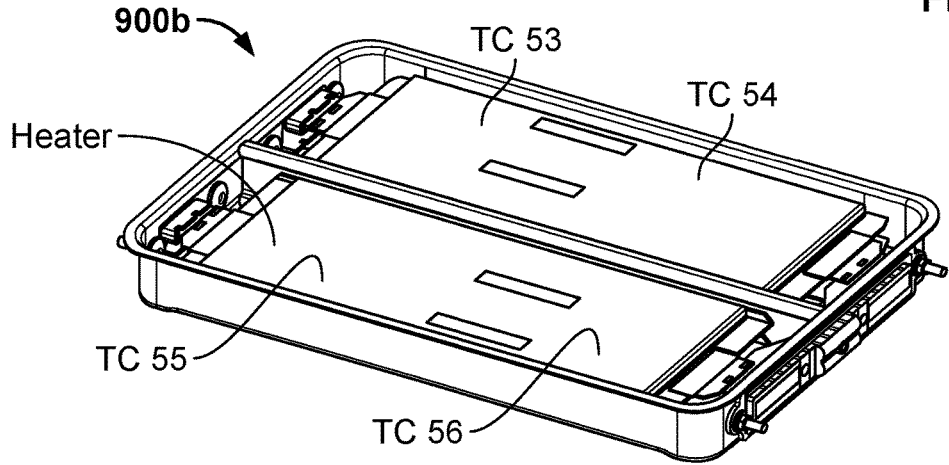
FIG. 9B is a diagram illustrating an embodiment of temperature sensors that monitor a top layer of battery cells in an initiated battery module during a thermal test.

FIG. 9B is a diagram illustrating an embodiment of temperature sensors that monitor a top layer of battery cells in an initiated battery module during a thermal test. In this example, the placement of temperature sensors TC 53-TC 56 is shown relative to the initiated battery module (900b).

Figure 9C:
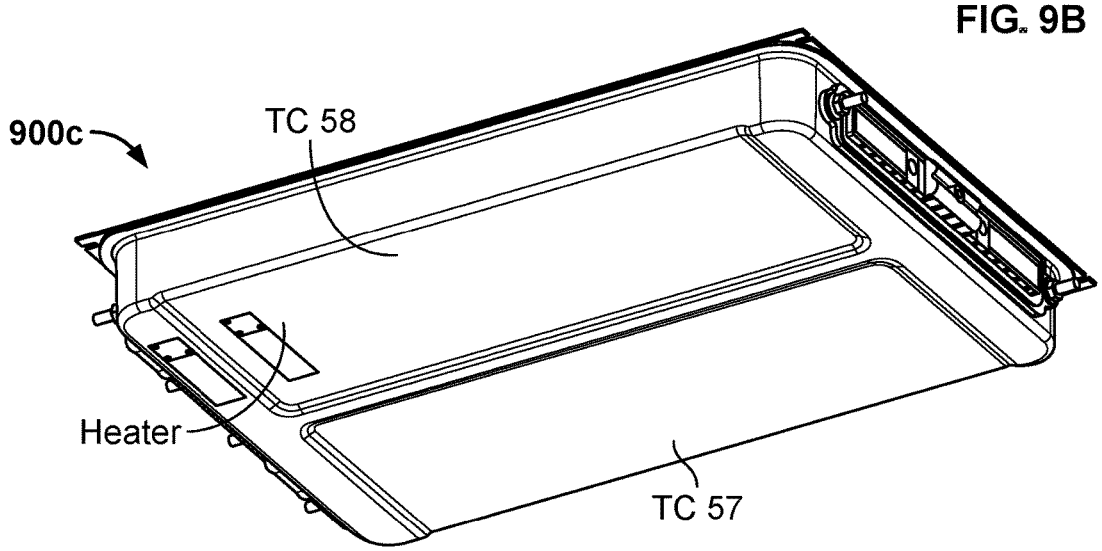
FIG. 9C is a diagram illustrating an embodiment of temperature sensors placed at a can bottom in an initiated battery module during a thermal test.

FIG. 9C is a diagram illustrating an embodiment of temperature sensors placed at a can bottom in an initiated battery module during a thermal test. In this example, the placement of temperature sensors TC 57 and TC 58 is shown relative to the initiated battery module (900c).

Figure 10:
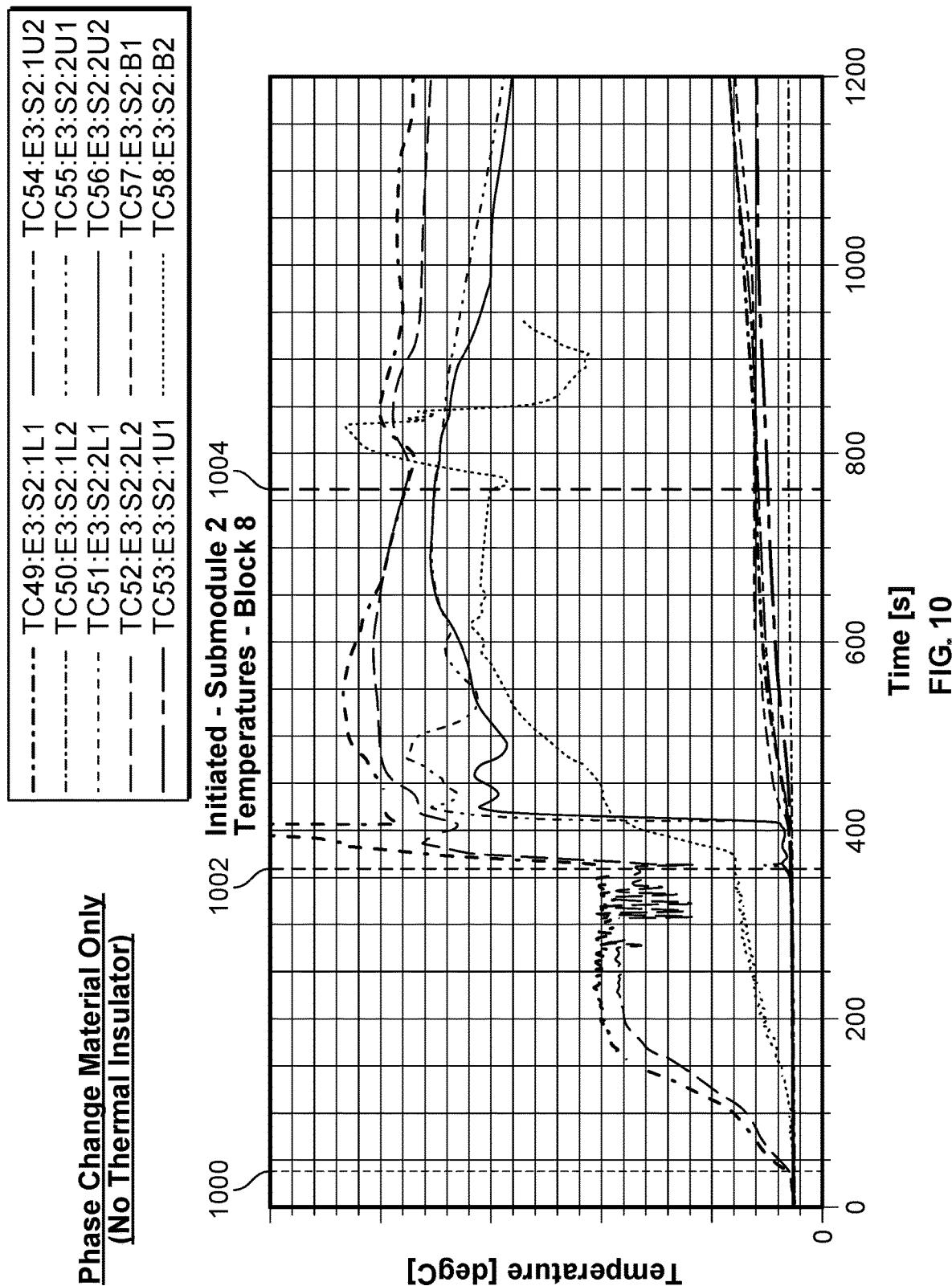
FIG. 10 is a graph illustrating an embodiment of temperatures in an initiated battery module where the pouches only contain phase change material and no thermal insulator.

FIG. 10 is a graph illustrating an embodiment of temperatures in an initiated battery module where the pouches only contain phase change material and no thermal insulator. In this example, the first (i.e., left) dashed line (1000) corresponds to the heater being turned on. At the second (i.e., center) dashed line (1002), the initiated battery cell (e.g., next to the heater) goes into thermal runaway. At the third (i.e., right) dashed line (1004), an adjacent and/or neighboring battery cell goes into thermal runaway (i.e., propagation has occurred).

FIG. 11A is a diagram illustrating an embodiment of temperature sensors that monitor a bottom layer of battery cells in a lower battery module during a thermal test. In this example, the placement of temperature sensors TC 59-TC 62 is shown relative to the lower battery module (1100a).

FIG. 11B is a diagram illustrating an embodiment of temperature sensors that monitor a top layer of battery cells in a lower battery module during a thermal test. In this example, the placement of temperature sensors TC 63-TC 66 is shown relative to the lower battery module (1100b).

FIG. 11C is a diagram illustrating an embodiment of temperature sensors placed at a can bottom in a lower battery module during a thermal test. In this example, the placement of temperature sensors TC 67 and TC 68 is shown relative to the lower battery module (1100c).

Figure 12:
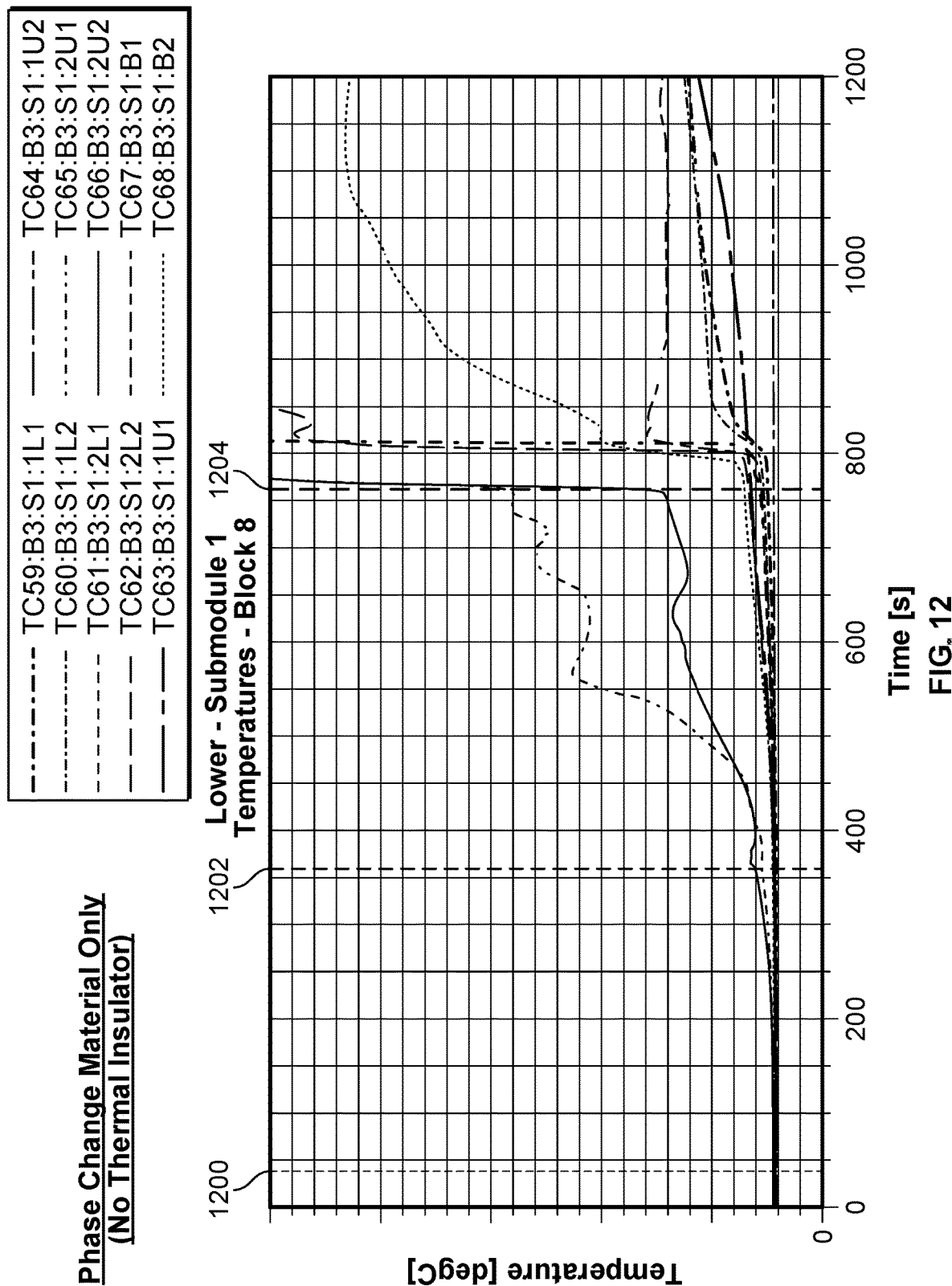
FIG. 12 is a graph illustrating an embodiment of temperatures in a lower battery module where the pouches only contain phase change material and no thermal insulator.

FIG. 12 is a graph illustrating an embodiment of temperatures in a lower battery module where the pouches only contain phase change material and no thermal insulator. As in the previous examples, the first (i.e., left) dashed line (1200) corresponds to the heater being turned on. At the second (i.e., center) dashed line (1202), the initiated battery cell (e.g., next to the heater) goes into thermal runaway. At the third (i.e., right) dashed line (1204), an adjacent and/or neighboring battery cell goes into thermal runaway (i.e., propagation has occurred).

Immediately before the third (i.e., right) dashed line (1204) before propagation, the cell temperature TC 65 (temporarily) peaks and (temporarily) holds steady at a temperature above the critical temperature threshold (e.g., ~150-180° C.). Soon after that (i.e., substantially at the third (i.e., right) dashed line (1204)), the cell temperature TC 65 shoots up to an even higher temperature that is even further above the critical temperature threshold. Other cell temperatures such as TC 61 and TC 62 also shoot up after the third dashed line (1204) (i.e., when propagation to an adjacent and/or neighboring battery cell occurs), indicating wider propagation.

In contrast, the same battery block configuration but with pouches that also include a NW thermal insulator performed better. Other embodiments may use other types of wettable thermal insulators and they may also exhibit improved performance over pouches with just a phase change material. The following figures show those test results.

Figure 13:
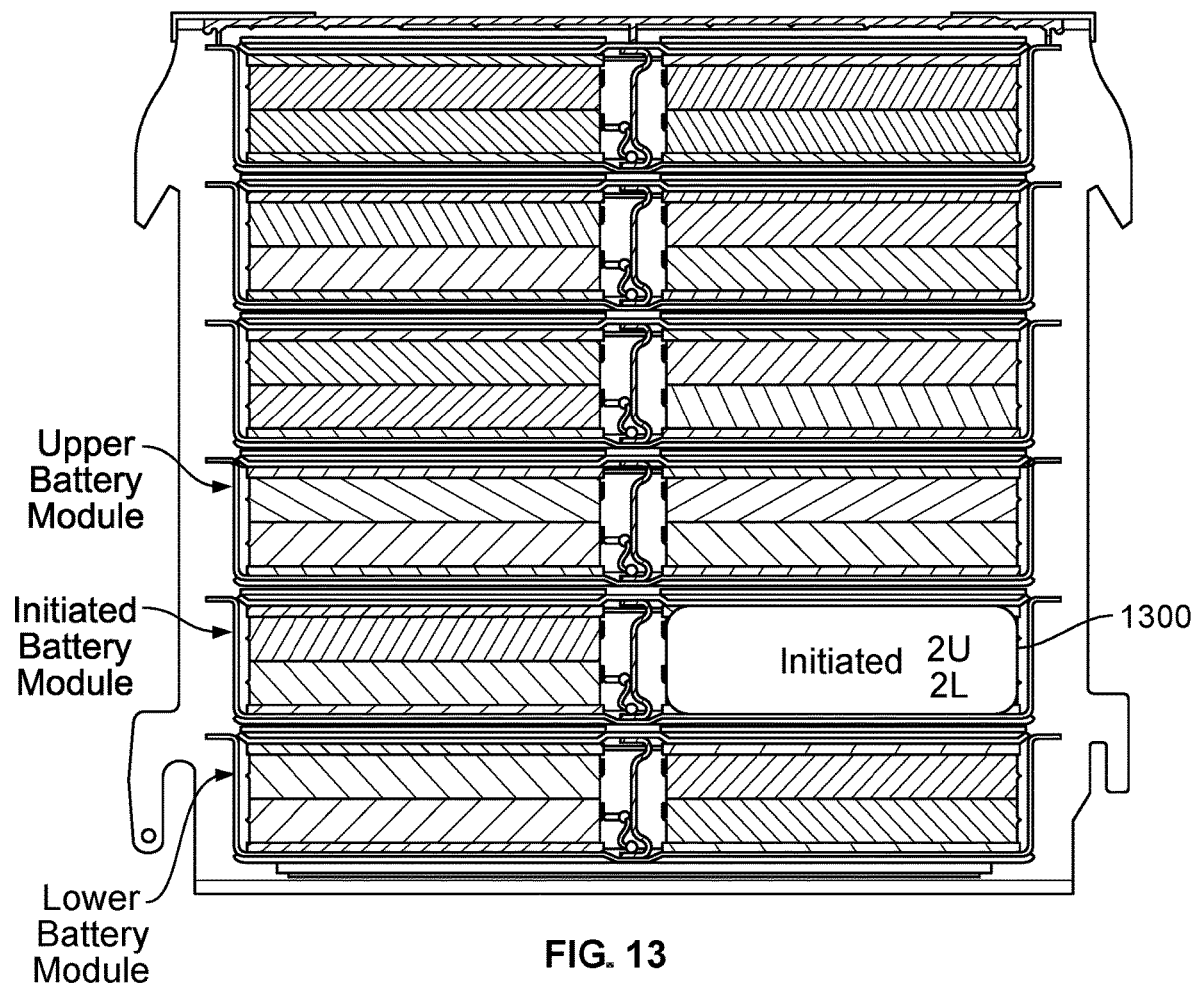
FIG. 13 is a diagram illustrating an embodiment of propagation test results within a battery block where the pouches contain a phase change material and a thermal insulator.

FIG. 13 is a diagram illustrating an embodiment of propagation test results within a battery block where the pouches contain a phase change material and a thermal insulator. In this example, propagation was limited to the initiated sub-module (1300) and did not spread to the degree that was observed in FIG. 6. More specifically:

TABLE 2

Propagation timeline corresponding to FIG. 13.

| Propagation Location | Time |
| --- | --- |
| Initiated battery module 2L | 0 seconds |
| Initiated battery module 2U | 40 seconds |

Figure 14:
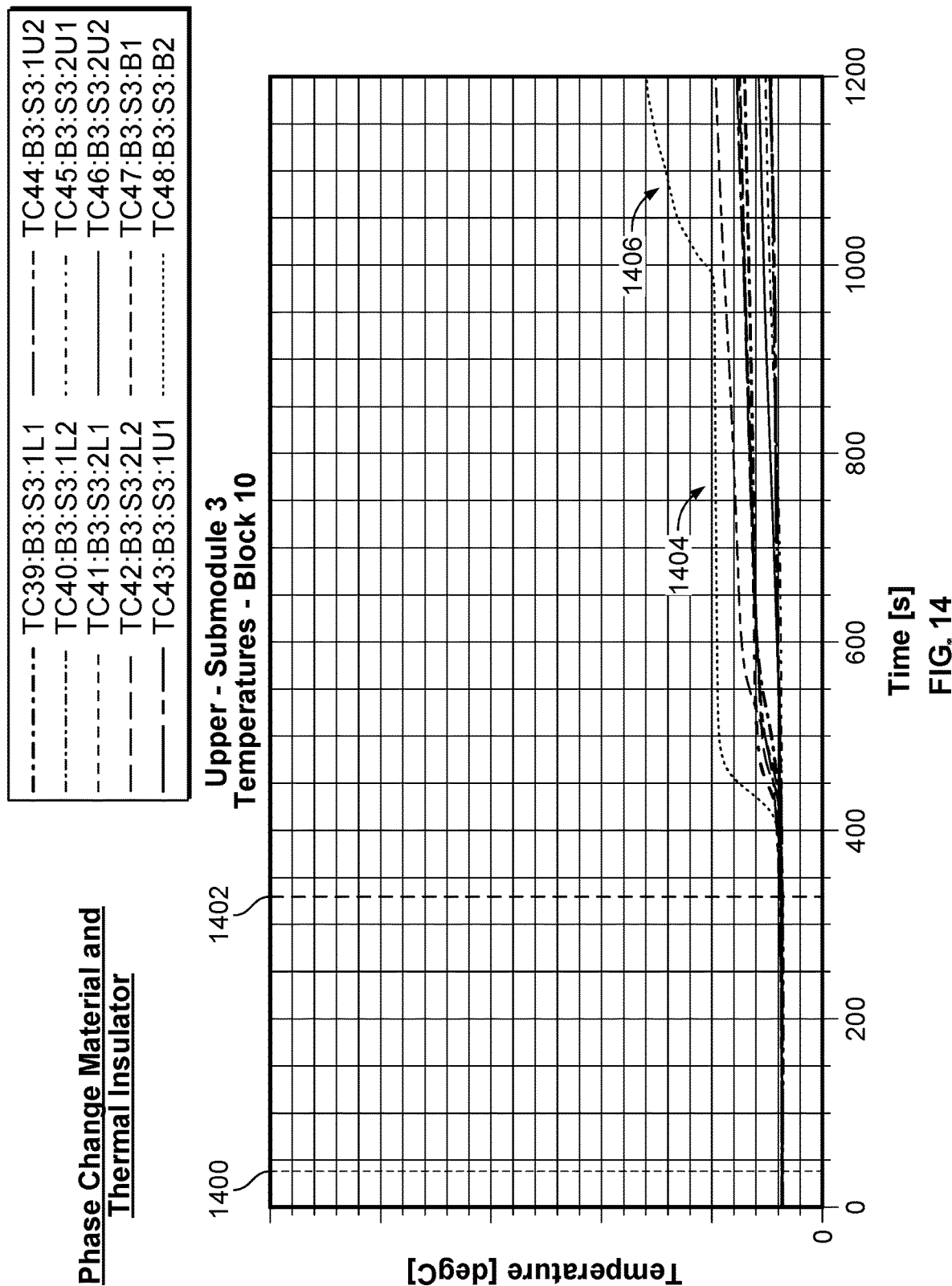
FIG. 14 is a graph illustrating an embodiment of temperatures in an upper battery module where the pouches contain a phase change material and a thermal insulator.

FIG. 14 is a graph illustrating an embodiment of temperatures in an upper battery module where the pouches contain a phase change material and a thermal insulator. In this example, the first (i.e., left) dashed line (1400) corresponds to the heater being turned on and the second (i.e., right) dashed line (1402) corresponds to the initiated battery cell (e.g., next to the heater) going into thermal runaway. As indicated in Table 2, there is no further propagation after that.

The cell temperatures TC 39-TC 46 (i.e., excluding can bottom temperatures TC 48 and TC 49) have a maximum or peak that is well below the critical temperature threshold and a clamping time (e.g., a duration of time during which the cell temperature(s) is/are relatively steady at the boiling temperature of the liquid used (see flat section 1404 of TC 48)) of ~500 seconds. This keeps the battery cells for this upper battery module well below dangerous temperatures which could cause propagation.

The inclusion of the thermal insulator helps to redistribute the remaining liquid to hot spots where all of the liquid has (locally) evaporated during the phase change of the liquid to gas. In contrast, the clamping time for the upper battery module when the pouches did not contain NW thermal insulator was ~100 seconds (see flat section 806 of TC 48 in FIG. 8), which is less desirable. The temperatures during the flat section 806 in FIG. 8 and the flat section 1404 in FIG. 14 are both less than the boiling point of liquid, indicating that those sections correspond to a phase change period of time during which the liquid boils off.

After the flat section (1404) of TC 48 in FIG. 14, the temperature begins to rise again (see the increasing section (1406)). The inclusion of thermal insulator in the configuration of FIG. 14 produces a temperature increase that has a slower temperature increase compared to increasing section (808) of TC 48 in FIG. 8. The presence of the thermal insulator in the test configuration of FIG. 14 has a resistive (e.g., somewhat linear) effect on temperature, whereas in FIG. 8 where there is no NW thermal insulator. As a result, the temperature increase in section 808 of TC 48 in FIG. 8 is much steeper due to thermal convection and thermal radiation, both of which are unimpeded by a NW thermal insulator in FIG. 8.

As described above, a NW thermal insulator offers benefits during the phase change stage (i.e., when the phase change material is changing from a liquid state to a gaseous state) and also later after the phase change material is entirely in a gaseous state and/or has escaped the pouch.

Figure 15:
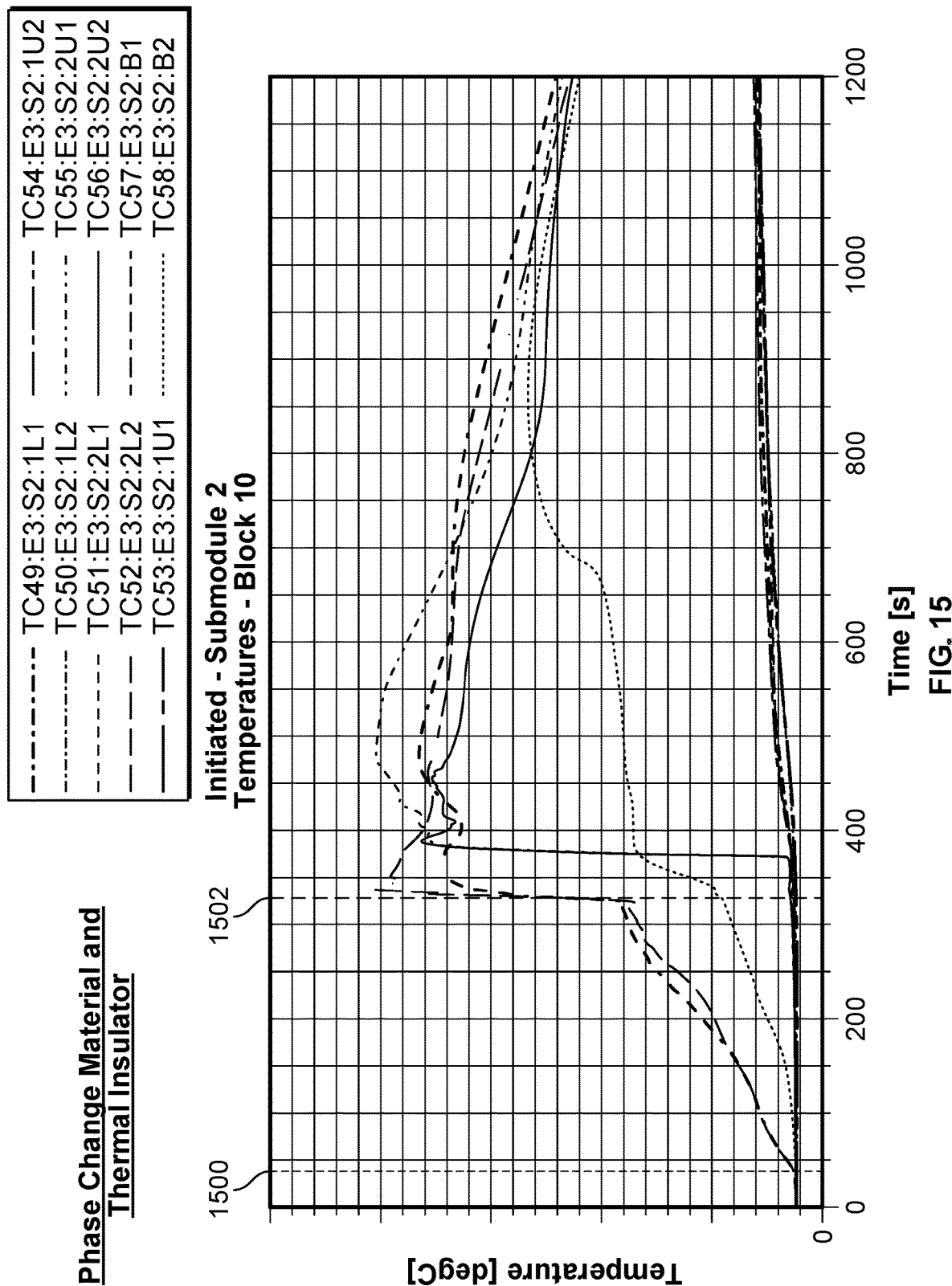
FIG. 15 is a graph illustrating an embodiment of temperatures in an initiated battery module where the pouches contain a phase change material and a thermal insulator.

FIG. 15 is a graph illustrating an embodiment of temperatures in an initiated battery module where the pouches contain a phase change material and a thermal insulator. In this example, the heater is turned on at the first (i.e., left) dashed line (1500) and the initiated battery cell (e.g., next to the heater) going into thermal runaway at the second (i.e., right) dashed line (1502).

In this example, the maximum or peak temperature in the initiated half or battery sub-module (e.g., amongst TC 51, TC 52, TC 55, TC 56, and TC 58, which are all in the same half or battery sub-module as the heater) is well above a critical temperature threshold (e.g., see TC 52 immediately after the right dashed line (1502)). The peak of neighboring temperatures (e.g., from the temperature sensors in the half without the heater) is roughly ⅙$^{th}$ of that, illustrating that the battery cells in the other half (i.e., the half without the heater) are not in danger of going into thermal runaway.

Figure 16:
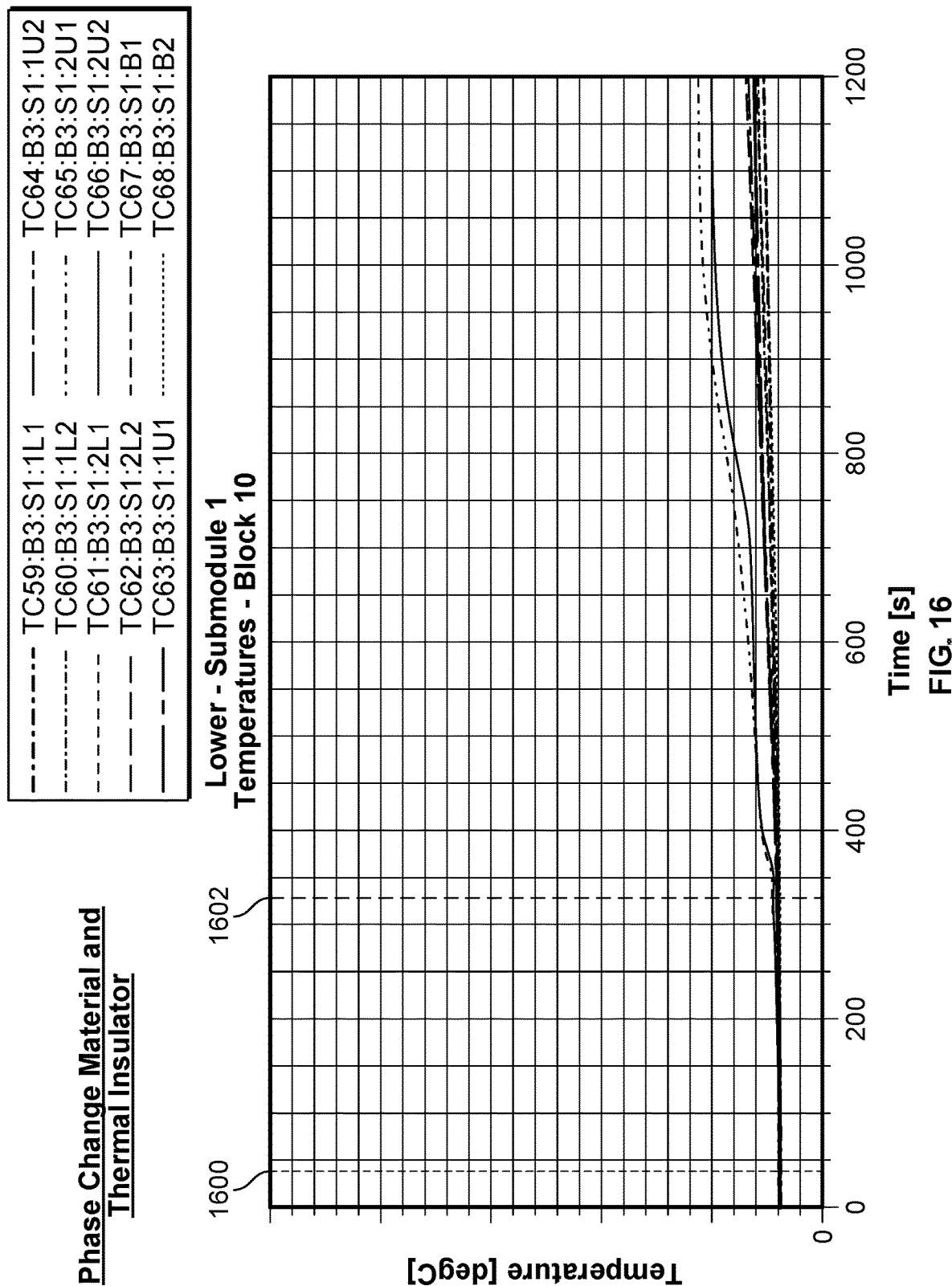
FIG. 16 is a graph illustrating an embodiment of temperatures in a lower battery module where the pouches contain a phase change material and a thermal insulator.

FIG. 16 is a graph illustrating an embodiment of temperatures in a lower battery module where the pouches contain a phase change material and a thermal insulator. In this example, the heater is turned on at the first (i.e., left) dashed line (1600) and the initiated battery cell (e.g., next to the heater) going into thermal runaway at the second (i.e., right) dashed line (1602).

In this example, the maximum or peak temperature is below critical temperature threshold, again indicating that the associated battery cells are not in danger of going into thermal runaway.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a wettable thermal insulator;
a phase change material, wherein in the event a thermal event occurs, the phase change material changes from a liquid state to a gaseous state; and
a flexible pouch, wherein the flexible pouch is configured to envelope the wettable thermal insulator and the phase change material in the liquid state.

2. The system recited in claim 1, wherein the wettable thermal insulator includes one or more of the following: a non-woven (NW) thermal insulator, ceramic wool, mineral wool, stone wool, or fiberglass.

3. The system recited in claim 1, wherein the phase change material includes one or more of the following: $H_2O$, a salt, an alcohol, a mineral oil, or a paraffin.

4. The system recited in claim 1, wherein the phase change material is selected based, at least in part, on one or more of the following material properties: specific latent heat of vaporization, surface tension, boiling point, or flammability.

5. The system recited in claim 4, wherein the layer of heat-sealable plastic is selected, at least in part, based on one or more of the following: abrasion resistance, puncture resistance, or an ability to tear in a preferred direction.

6. The system recited in claim 1, wherein the flexible pouch is made of a plurality of layers that includes one or more of the following: a layer of a vapor barrier, a layer of metal foil, a layer of aluminum, a layer of an aluminum alloy, a layer of heat-sealable plastic, food grade packaging material, or GEE retort film.

7. The system recited in claim 1, wherein the pouch is configured to burst in response to a pressure increase associated with the change of the phase change material from the liquid state to the gaseous state.

8. The system recited in claim 1, wherein:
the pouch is configured to burst in response to a pressure increase associated with the change of the phase change material from the liquid state to the gaseous state; and
the phase change material in the gaseous state is vented through a hole created by the bursting of the flexible pouch.

9. The system recited in claim 1, wherein:
the wettable thermal insulator includes a non-woven (NW) ceramic wool;
the phase change material includes $H_2O$; and
the flexible pouch includes GEE retort film.

10. The system recited in claim 1, wherein:
the flexible pouch includes GEE retort film; and
the GEE retort film includes a layer of polyethylene terephthalate (PET), a layer of aluminum, a layer of nylon (NY) and a layer of cast polypropylene (CPR).

11. The system recited in claim 1, wherein:
the flexible pouch includes GEE retort film;
the GEE retort film includes a layer of polyethylene terephthalate (PET), a layer of aluminum, a layer of nylon (NY), and a layer of cast polypropylene (CPR); and
the GEE retort film has a thickness within a range of 133-159 μm.

12. A method, comprising:
providing a wettable thermal insulator;
providing a phase change material, wherein in the event a thermal event occurs, the phase change material changes from a liquid state to a gaseous state; and
providing a flexible pouch, wherein the flexible pouch is configured to envelope the wettable thermal insulator and the phase change material in the liquid state.

13. The method recited in claim 12, wherein the wettable thermal insulator includes one or more of the following: a non-woven (NW) thermal insulator, ceramic wool, mineral wool, stone wool, or fiberglass.

14. The method recited in claim 12, wherein the phase change material includes one or more of the following: $H_2O$, a salt, an alcohol, a mineral oil, or a paraffin.

15. The method recited in claim 12, wherein the flexible pouch is made of a plurality of layers that includes one or more of the following: a layer of a vapor barrier, a layer of metal foil, a layer of aluminum, a layer of an aluminum alloy, a layer of heat-sealable plastic, food grade packaging material, or GEE retort film.

16. The method recited in claim 12, wherein the pouch is configured to burst in response to a pressure increase associated with the change of the phase change material from the liquid state to the gaseous state.

17. The method recited in claim 12, wherein:
the pouch is configured to burst in response to a pressure increase associated with the change of the phase change material from the liquid state to the gaseous state; and
the phase change material in the gaseous state is vented through a hole created by the bursting of the flexible pouch.

18. The method recited in claim 12, wherein:
the wettable thermal insulator includes a non-woven (NW) ceramic wool;
the phase change material includes $H_2O$; and
the flexible pouch includes GEE retort film.

19. The method recited in claim 12, wherein:
the flexible pouch includes GEE retort film; and
the GEE retort film includes a layer of polyethylene terephthalate (PET), a layer of aluminum, a layer of nylon (NY) and a layer of cast polypropylene (CPR).

20. The method recited in claim 12, wherein:
the flexible pouch includes GEE retort film;
the GEE retort film includes a layer of polyethylene terephthalate (PET), a layer of aluminum, a layer of nylon (NY), and a layer of cast polypropylene (CPR); and the GEE retort film has a thickness within a range of 133-159 μm.

\* \* \* \* \*